US009407953B2

(12) United States Patent
Nguyen

(10) Patent No.: US 9,407,953 B2
(45) Date of Patent: *Aug. 2, 2016

(54) SYSTEMS AND METHODS FOR REDUCING DISRUPTIONS IN RECORDED PROGRAMMING

(71) Applicant: EchoStar Technologies L.L.C., Englewood, CO (US)

(72) Inventor: Phuc H. Nguyen, Parker, CO (US)

(73) Assignee: EchoStar Technologies L.L.C., Englewood, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 14/719,093

(22) Filed: May 21, 2015

(65) Prior Publication Data

US 2015/0256878 A1 Sep. 10, 2015

Related U.S. Application Data

(63) Continuation of application No. 13/715,055, filed on Dec. 14, 2012, now Pat. No. 9,071,811, which is a continuation of application No. 12/511,887, filed on Jul. 29, 2009, now Pat. No. 8,358,911.

(51) Int. Cl.
G11B 27/00 (2006.01)
H04N 21/433 (2011.01)
(Continued)

(52) U.S. Cl.
CPC .......... H04N 21/4334 (2013.01); G11B 27/36 (2013.01); H04N 5/76 (2013.01); H04N 5/94 (2013.01); H04N 9/79 (2013.01); H04N 21/4147 (2013.01); H04N 21/443 (2013.01); H04N 21/44008 (2013.01); H04N 21/44209 (2013.01);
(Continued)

(58) Field of Classification Search
CPC .. G11B 27/034; G11B 2220/90; G11B 27/34; G11B 27/105; H04N 9/8042
USPC .......................................................... 386/278
See application file for complete search history.

(56) References Cited

U.S. PATENT DOCUMENTS 6,681,396 B1 1/2004 Bates et al.
2003/0219228 A1 11/2003 Thiagarajan et al.
(Continued)

FOREIGN PATENT DOCUMENTS

WO 2009/023737 A2 2/2009

OTHER PUBLICATIONS

International Search Report, mailed Oct. 12, 2010, for International Application No. PCT/US2010/042936, 4 pages.
(Continued)

Primary Examiner — William C Vaughn, Jr.
Assistant Examiner — Daniel Tekle
(74) Attorney, Agent, or Firm — Seed IP Law Group PLLC

(57) ABSTRACT

Various embodiments reduce disruptions in recorded programming, by automatically recording retransmissions of prior programming. In one embodiment, a recording manager is provided for execution on a receiving device, such as a set-top box. The recording manager detects a disruption in a recorded program. In response, the recording manager automatically records, or schedules a recording of, a later transmission of the same program. This abstract is provided to comply with rules requiring an abstract, and it is submitted with the intention that it will not be used to interpret or limit the scope or meaning of the claims.

17 Claims, 8 Drawing Sheets

(51) Int. Cl.
*H04N 5/76* (2006.01)
*H04N 5/94* (2006.01)
*H04N 21/4147* (2011.01)
*H04N 21/44* (2011.01)
*H04N 21/443* (2011.01)
*H04N 21/458* (2011.01)
*H04N 21/475* (2011.01)
*H04N 21/488* (2011.01)
*H04N 9/79* (2006.01)
*G11B 27/36* (2006.01)
*H04N 21/442* (2011.01)
*H04N 21/472* (2011.01)

(52) U.S. Cl.
CPC ..... *H04N 21/44231* (2013.01); *H04N 21/4583* (2013.01); *H04N 21/4758* (2013.01); *H04N 21/47214* (2013.01); *H04N 21/4882* (2013.01)

(56) References Cited

U.S. PATENT DOCUMENTS

| | | | |
|---|---|---|---|
| 2003/0231854 A1 | 12/2003 | Derrenberger | |
| 2004/0033061 A1 | 2/2004 | Hughes, Jr. et al. | |
| 2005/0160308 A1* | 7/2005 | Elcock | G11B 27/36 |
| | | | 714/5.1 |
| 2009/0245758 A1 | 10/2009 | Kodama et al. | |
| 2009/0276224 A1* | 11/2009 | Medina | H04N 7/17336 |
| | | | 704/275 |

OTHER PUBLICATIONS

Written Opinion, mailed Oct. 12, 2010, for International Application No. PCT/US2010/042936, 6 pages.

\* cited by examiner

| | Program ID (332a) | Channel Number (332b) | Title (332c) | Start Time (332d) | Duration (332e) | ... (332f) |
|---|---|---|---|---|---|---|
| 334a | 3439 | 13 | Sitcom 1 | 2009-06-30:12:30 | 30 | |
| 334b | 4549 | 43 | Competitive Eating | 2009-06-30:12:30 | 30 | |
| 334c | 2880 | 13 | Golf Week | 2009-06-30:12:30 | 60 | |
| 334d | 4790 | 234 | True Crime | 2009-06-30:19:00 | 60 | |
| 334e | 3439 | 43 | Sitcom 1 | 2009-07-02:17:30 | 30 | |
| 334f | 3456 | 234 | Sitcom 2 | 2009-06-30:13:00 | 30 | |
| 334g | 3889 | 13 | Crime Drama 1 | 2009-06-30:21:00 | 60 | |
| 334h | 4790 | 133 | True Crime | 2009-07-01:20:00 | 60 | |
| 334i | 8823 | 110 | Movie XYZ | 2009-06-30:22:00 | 120 | |
| 334j | ... | | | | | |

*Fig. 3C*

SYSTEMS AND METHODS FOR REDUCING DISRUPTIONS IN RECORDED PROGRAMMING

TECHNICAL FIELD

The technical field relates to reducing disruptions in recorded programming and more particularly, to apparatus, systems, and methods for detecting a disruption in a recorded program, and in response, automatically initiating a recording of a retransmission of the program occurring at a later time.

BRIEF SUMMARY

In one embodiment, a method for recording a retransmission of a prior program is provided. The method includes: recording a program as a first recording; detecting a disruption in the program recorded as the first recording; storing an indication of the disruption of the program recorded as the first recording; recording a rebroadcast of the program as a second recording in response to the stored indication of the disruption of the first recording, the rebroadcast occurring at a second time that is later than the first time; and outputting content of one of the first recording or the second recording, based at least in part on the input selection received from a user.

In another embodiment, a receiving configured to record a retransmission of a prior program is provided. The set-top box includes a processor configured to: record, at a first time, a program as a first recording; detect a disruption in the program recorded as the first recording; in response to detecting the disruption, determine a rebroadcast of the program, the rebroadcast occurring at a second time that is later than the first time; and record, at the second time, the program as a second recording; and output program content of one of the first recording or the second recording, based at least in part on a selection received from a user.

In another embodiment, a computer-readable medium is provided, the computer-readable medium including contents that enable a receiving device to record a retransmission of a prior program. The contents, when executed, perform a method comprising: initiating recording of a first transmission of a program, the first transmission of the program occurring at a first time and recorded as a first recording; detecting a disruption in the program recorded as the first recording; and in response to the detected disruption in the program recorded as the first recording, determining a second transmission of the program, the second transmission occurring at a second time that is after the first time; and initiating recording of at least some of the second transmission of the program as a second recording.

BRIEF DESCRIPTION OF THE DRAWINGS

The components in the drawings are not necessarily to scale relative to each other. Like reference numerals designate corresponding parts throughout the several views.

FIGS. 3A-3C are block diagrams illustrating example user interfaces of, and program information used in, example embodiments.

DETAILED DESCRIPTION

A. Environment Overview

Figure 1:
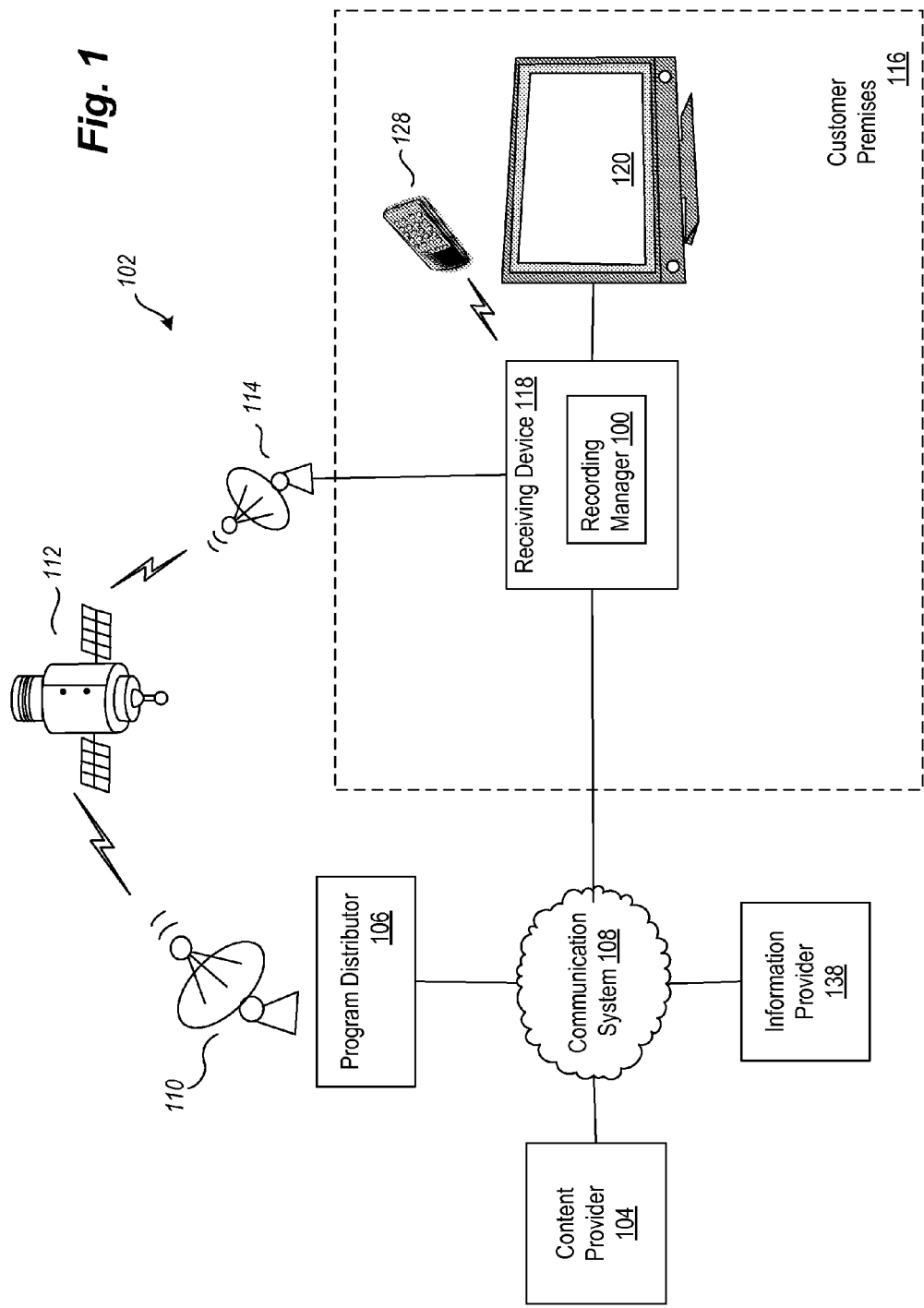
FIG. 1 is a block diagram illustrating an example content distribution environment in which embodiments of a recording manager may be implemented.

FIG. 1 is an overview block diagram illustrating an example content distribution environment 102 in which embodiments of a recording manager 100 may be implemented. The recording manager is operable to automatically record a retransmission of a previously transmitted program (the "prior program") during which a disruption, such as a signal outage, occurred. In this example, the recording manager 100 operates upon a receiving device 118 and is configured to detect a disruption in a recorded program, and in response, automatically record a later transmission of the same program. The recording manager 100 then notifies a user of the disruption, and provides the user with an option to view the recording of the later transmission of the program. Using such techniques, the recording manager 100 can improve the user's experience by reducing disruptions perceived by the user when viewing recorded programs. Before providing additional details regarding the operation and constitution of the recording manager 100, the content distribution environment 102 of the recording manager 100 will briefly be described.

In the content distribution environment 102, audio, video, and/or data service providers, such as, but not limited to, television service providers, provide their customers a multitude of audio/video and/or data programming (hereafter, collectively and/or exclusively "programming"). Such programming is often provided by use of a receiving device 118 communicatively coupled to a presentation device 120 configured to receive the programming.

The receiving device 118 interconnects to one or more communications media or sources (such as a cable head-end, satellite antenna, telephone company switch, Ethernet portal, off-air antenna, or the like) that provide the programming. The receiving device 118 commonly receives a plurality of programming by way of the communications media or sources described in greater detail below. Based upon selection by a user, the receiving device 118 processes and communicates the selected programming to the presentation device 120.

For convenience, the receiving device 118 may be interchangeably referred to as a "television converter," "receiver," "set-top box," "television receiving device," "television receiver," "television recording device," "satellite set-top box," "satellite receiver," "cable set-top box," "cable receiver," "media player," and/or "television tuner." Accordingly, the receiving device 118 may be any suitable converter device or electronic equipment that is operable to receive programming. Further, the receiving device 118 may itself include user interface devices, such as buttons or switches. In many applications, a remote-control device ("remote") 128 is operable to control the receiving device 118 and/or the presentation device 120. The remote 128 typically communicates with the receiving device 118 using a suitable wireless medium, such as infrared ("IR"), radio frequency ("RF"), or the like.

Examples of a presentation device 120 include, but are not limited to, a television ("TV"), a personal computer ("PC"), a sound system receiver, a digital video recorder ("DVR"), a compact disk ("CD") device, game system, or the like. Presentation devices 120 employ a display, one or more speakers, and/or other output devices to communicate video and/or audio content to a user. In many implementations, one or more presentation devices 120 reside in or near a customer's premises 116 and are communicatively coupled, directly or indirectly, to the receiving device 118. Further, the receiving device 118 and the presentation device 120 may be integrated into a single device. Such a single device may have the above-described functionality of the receiving device 118 and the presentation device 120, or may even have additional functionality.

A content provider 104 provides program content, such as television content or audio content, to a distributor, such as the program distributor 106. Example content providers include television stations which provide local or national television programming, special content providers which provide premium based programming or pay-per-view programming, or radio stations which provide audio programming.

Program content, interchangeably referred to as a program, is communicated to the program distributor 106 from the content provider 104 through suitable communication media, generally illustrated as communication system 108 for convenience. Communication system 108 may include many different types of communication media, now known or later developed. Non-limiting media examples include telephony systems, the Internet, internets, intranets, cable systems, fiber optic systems, microwave systems, asynchronous transfer mode ("ATM") systems, frame relay systems, digital subscriber line ("DSL") systems, radio frequency ("RF") systems, and satellite systems.

In at least one embodiment, the received program content is converted by the program distributor 106 into a suitable signal (a "program signal") that is communicated (i.e., "uplinked") by one or more antennae 110 to one or more satellites 112 (separately illustrated herein from, although considered part of, the communication system 108). The communicated uplink signal may contain a plurality of multiplexed programs. The uplink signal is received by the satellite 112 and then communicated (i.e., "downlinked") from the satellite 112 in one or more directions, for example, onto a predefined portion of the planet.

A receiver antenna 114 that is within reception range of the downlink signal communicated from satellite 112 receives the above-described downlink signal. A wide variety of receiver antennae 114 are available. Some types of receiver antenna 114 are operable to receive signals from a single satellite 112. Other types of receiver antenna 114 are operable to receive signals from multiple satellites 112 and/or from terrestrial based transmitters. In some embodiments, antenna 114 is a terrestrial "over-the-air" ("OTA") broadcast antenna that is configured to receive a program signal from a terrestrial based transmitter, such as broadcast transmit tower. Furthermore, in some cases, the receiving device 118 is operable to receive signals from multiple, distinct antennas.

The receiver antenna 114 can be located at customer premises 116. Examples of customer premises 116 include a residence, a business, or any other suitable location operable to receive signals from satellite 112. The received signal is communicated, typically over a hard-wire connection, to a receiving device 118. The receiving device 118 converts the received signal from antenna 114 into a signal and/or format suitable for communication to a presentation device 120 or another device, such as a digital video recorder or a home computing system. In some embodiments, the antenna 114 may be remotely located from the customer premises 116. For example, the antenna 114 may be located on the roof of an apartment building, such that the received signals may be transmitted, after possible recoding, via cable or other mechanisms, such as Wi-Fi, to the customer premises 116.

The receiving device 118 may receive programming partially from, or entirely from, another source other than the above-described receiver antenna 114. Other embodiments of the receiving device 118 may receive programming from program distributors 106 and/or content providers 104 via locally broadcast RF signals, cable, fiber optic, Internet media, or the like.

In addition, information provider 138 may provide various forms of content and/or services to various devices residing in the customer premises 116. For example, information provider 138 may provide a Web page (or other information) to the receiving device 118 or other computing device. Information provider 138 may further perform or facilitate electronic commerce transactions.

In the illustrated example, the recording manager 100 operates upon the receiving device 118. The recording manager 100 is configured to detect a disruption in a program received and recorded by the receiving device 118. Program disruptions may occur for various reasons, including poor weather conditions (e.g., high winds, cloud cover) and/or obstructions (e.g., trees) that degrade/attenuate one or more characteristics (e.g., power, consistency, or regularity) of the program signal received by the antenna 114. Program disruptions include program signal disruptions occurring for other reasons, such as service outages or faults in the satellite 112, uplink antenna 110, program distributor 106, content provider 104, or the communication system 108 generally. Program disruptions may also occur due to outages or faults that are local to the receiving device 118 and/or customer premises 116, such as recording media (e.g., disk) errors, memory faults, software errors, resource constraints (e.g., insufficient processing power, processor throughput, disk bandwidth, or the like), local network outages, local power outages, and the like.

The recording manager 100 is further configured to, in response to a detected disruption in a program recorded as a first recording, record a later transmission of the program as a second recording. As one example, upon detecting a disruption in a particular program, the recording manager 100 determines a later (e.g., later in the day or week) broadcast of the program, and schedules a recording to occur at that time. The recording manager is also configured to notify a user that a disruption has been detected in the first recording, and to provide the user the option of viewing the second recording as an alternative to the first recording.

The above description of the content distribution environment 102 and the customer premises 116, and the various devices therein, is intended as a broad, non-limiting overview of an example environment in which various embodiments of a recording manager may be implemented. FIG. 1 illustrates just one example of a content distribution environment 102 and that the various embodiments discussed herein are not limited to such environments. In particular, content distribution environment 102 and the various devices therein, may contain other devices, systems and/or media not specifically described herein.

Example embodiments described herein provide applications, tools, data structures and other support to implement a recording manager that facilitates improved recording of programs received by a receiving device. Other embodiments of the described techniques may be used for other purposes, including storage of data transmissions generally. In the following description, numerous specific details are set forth, such as data formats, code sequences, and the like, in order to provide a thorough understanding of the described techniques. The embodiments described also can be practiced without some of the specific details described herein, or with other specific details, such as changes with respect to the ordering of the code flow, different code flows, and the like. Thus, the scope of the techniques and/or functions described are not limited by the particular order, selection, or decomposition of steps described with reference to any particular module, component, or routine.

B. Example Recording Manager Overview

Figure 2:
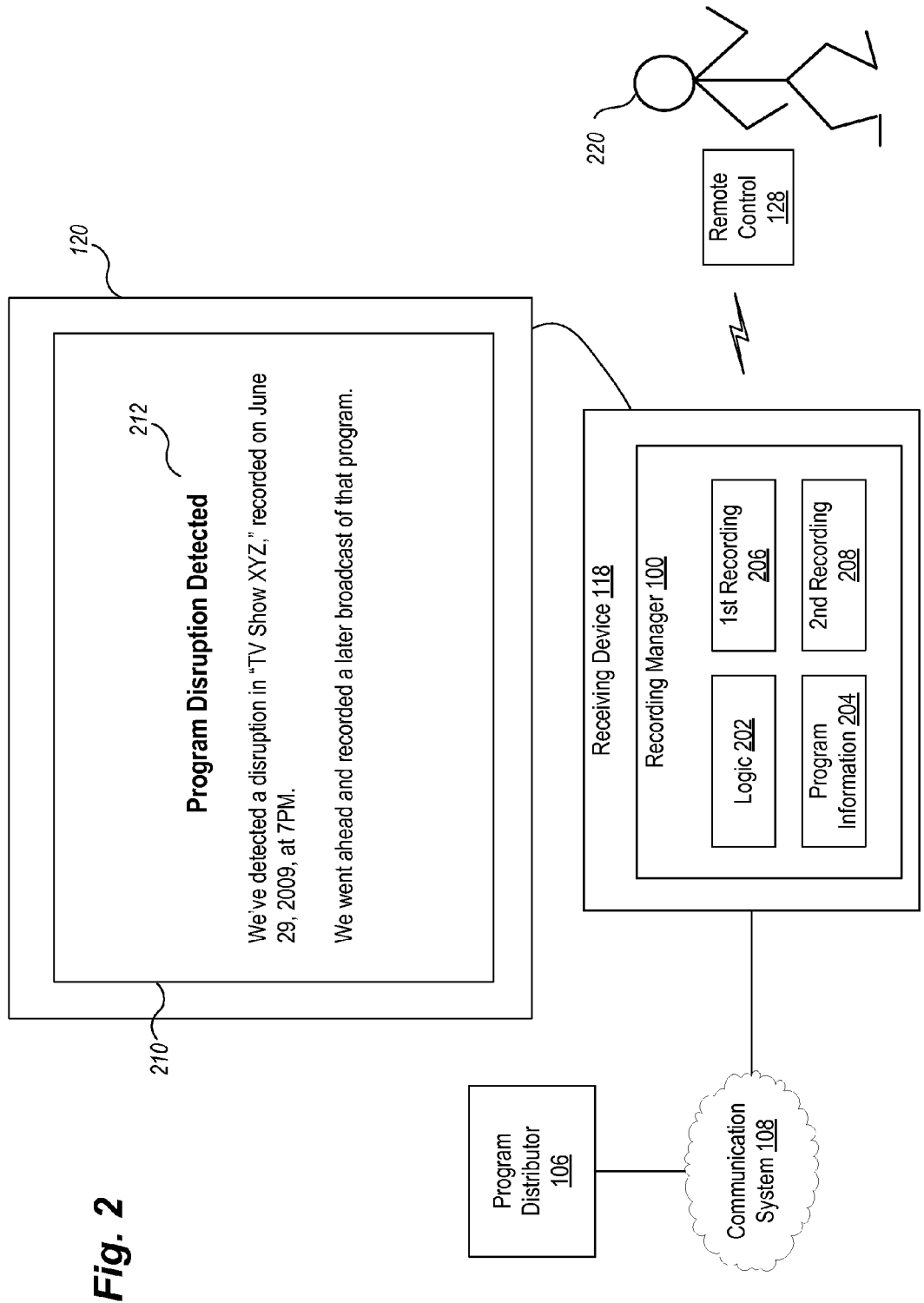
FIG. 2 is a block diagram illustrating example functional elements of an example embodiment.

FIG. 2 is a block diagram illustrating example functional elements of an example embodiment. In particular, FIG. 2 shows an example recording manager 100 executing on a receiving device 118. The illustrated receiving device 118, which may be a set-top box, is communicatively coupled to a presentation device 120 and to a program distributor 106 via communication system 108. A user 220 operates the receiving device 118 and/or the presentation device 120 using remote-control device 128. The recording manager 100 includes logic 202, program information 204, a first recording 206, and a second recording 208. Program information 204 includes program schedule information for programs scheduled for broadcast/transmission by the program distributor 106.

In a typical example, the user 220 interacts with the recording manager 100 to initiate recording of a program transmitted by the program distributor 106 to the receiving device 118. Initiating recording includes specifying a recording event, which specifies parameters, such as channel, begin time (e.g., current time or some future time), and duration, that are used by the recording manager 100 to record the desired program. As discussed with respect to FIG. 1, above, the program may be transmitted as a program signal to the receiving device 118 in various ways, such as via a satellite network, cable network, terrestrial broadcast, or the like. As the program signal is received by the receiving device 118, the recording manager 100 stores the received program as the first recording 206. For example, a tuner and/or selector of the receiving device 118 extracts program data portions (e.g., video and/or audio data portions) from the received program signal and provide those data portions to the recording manager 100. The recording manager 100 then stores the received data portions as the first recording 206.

The recording manager 100 is configured to detect disruptions in the program recorded as the first recording 206. In one embodiment, the recording manager 100 detects a disruption at the program signal level, such as by monitoring the quality (e.g., strength or energy) of the program signal received by the receiving device 118. When the strength of the program signal drops below a specified threshold level, the recording manager 100 stores an indication that a program disruption has been detected. In another embodiment, the recording manager 100 detects a disruption at the program level, by monitoring the quality of the video and/or audio provided by an audio/video processor (e.g., a component that is responsible for decompressing and/or formatting program data carried by the received program signal) of the receiving device 118. When the program video or audio becomes degraded (e.g., as indicated by video/audio dropouts, video pixilation, audio distortion, or the like), the recording manager 100 stores an indication that a program disruption has been detected.

The recording manager 100 may detect program disruptions at various times. In one embodiment, the recording manager 100 detects disruptions concurrently with the receiving and/or recording of the first recording 206. In another embodiment, the recording manager 100 detects disruptions after the program has been received and recorded, such as by post-processing the stored first recording 206.

If the recording manager 100 detects a disruption in the program recorded as the first recording 206, the recording manager 100 automatically determines a retransmission of the program occurring at a later time. Determining a retransmission of the program includes processing program information 204. In particular, the recording manager 100 searches the program information 204 for scheduling information that indicates a retransmission of the program. The retransmission may be currently in progress or be occurring at some time in the future.

The recording manager 100 then initiates recording of the determined retransmission of the program as the second recording 208. Initiating recording of the retransmission of the program includes scheduling a recording event to occur at a time corresponding to the retransmission of the program. In some cases, such as when the program is being currently re-transmitted, the recording manager commences recording of the program immediately.

The recording manager 100 is also configured to notify the user 220 of the detected program disruption. Notifying the user 220 includes displaying a user interface screen 210 on the presentation device 120. The user interface screen 210 includes a message 212 indicating that a disruption was detected in a transmission/recording of a particular program and that a second recording 208 is available for viewing. Typically, the message 212 is displayed at or about the time when the user 220 indicates a desire to view the program recorded as the first recording 206. However, the user 220 may be notified of the disruption at other times, such as when the user 220 operates the receiving device 118 for the first time after the disruption is detected.

Under certain circumstances, the recording manager 100 may elect not to initiate a recording of a retransmission of a prior program. In one embodiment, the recording manager 100 records a retransmission of a prior program only when the detected disruption is sufficiently severe, such as when an outage of the program signal or other disruption is detected that is longer than a specified time interval (e.g., five seconds). In another embodiment, the recording manager 100 records a retransmission of a prior program only when the user 220 has directed the recording manager 100 to do so (e.g., by responding to a query/prompt from the recording manager 100). In some embodiments, the recording manager 100 elects not to record a retransmission of a prior program when the only disruptions occur during commercial breaks, because typical users may not be bothered by such disruptions. In addition, at least some of the above conditional behaviors may be configured and/or specified via user interface controls, as described further with respect to FIG. 3B, below.

In addition, in some embodiments, the recording manager 100 may not record an entire retransmission of a prior program. In one embodiment, the recording manager 100 is configured to only record the portion of the retransmission corresponding to the disrupted portion of the first recording 206. For example, if a program signal outage was detected during the fifth minute of the first recording 206, the recording manager 100 may elect to only record (as recording 208) the fifth minute of the retransmission of the program. In such cases, the recording manager 100, may then combine or otherwise merge the recorded portion of the retransmission with the first recording 206. In some embodiments, the recording manager 100 will only merge the recorded portion of the retransmission with the first recording 206 when the recorded portion and the first recording 206 are both of the same data standard or format, such as standard definition, high definition, MPEG-2, MPEG-4, or the like.

C. Example Recording Manager Aspects

Figure 3A:
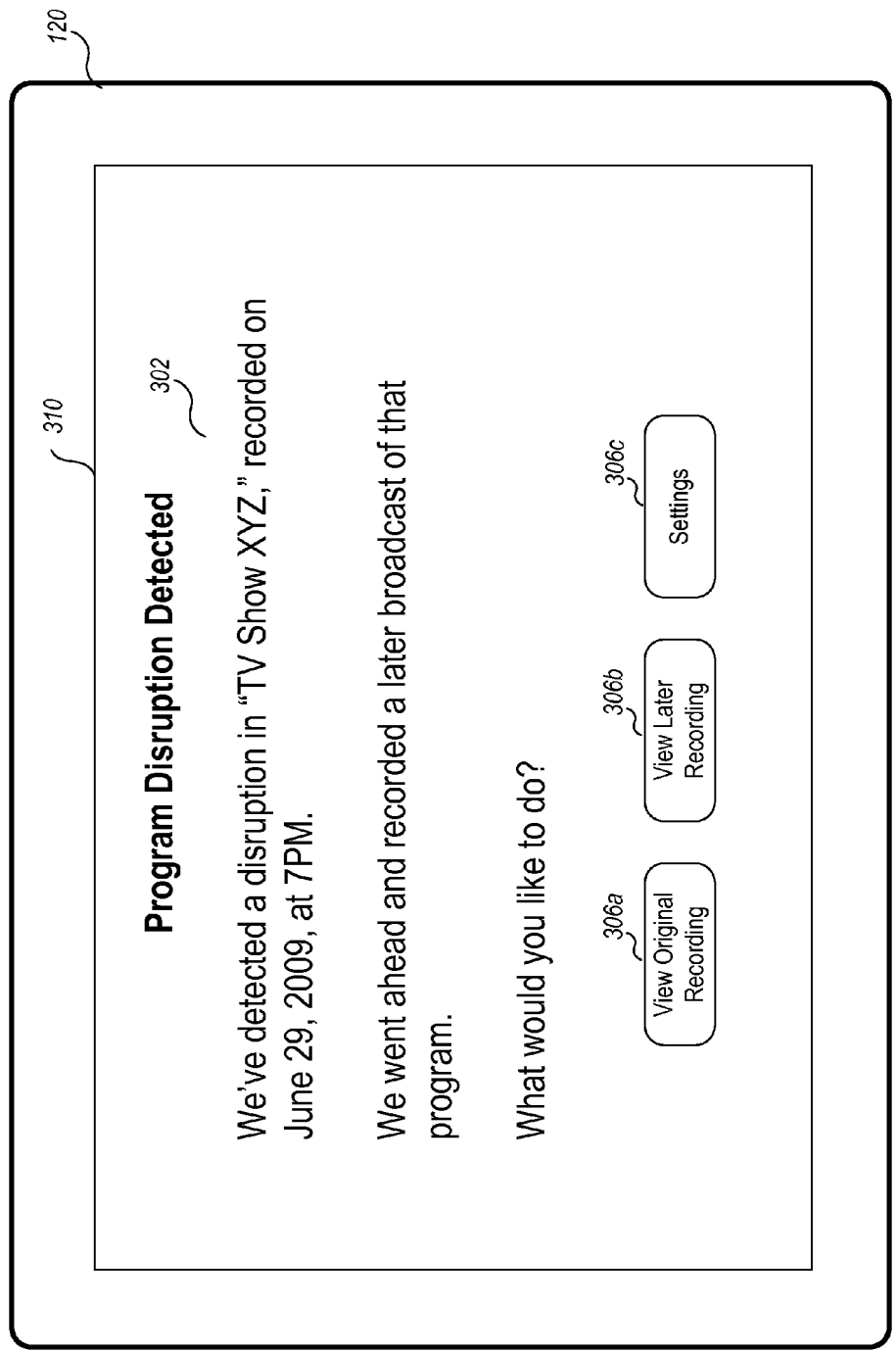
Figure 3B:
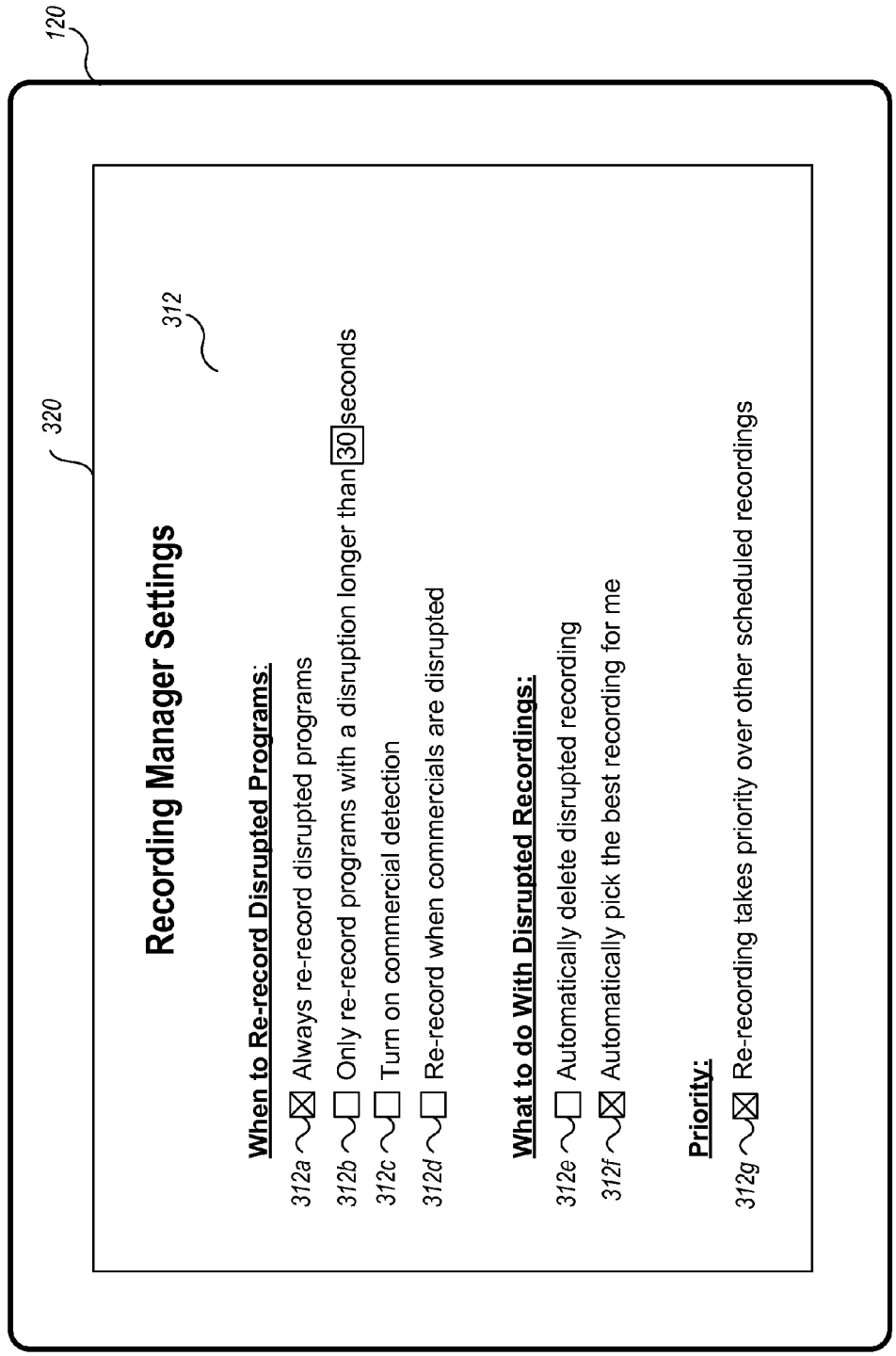

FIGS. 3A-3C are block diagrams illustrating example user interfaces of, and program information used in, example embodiments. In particular, FIGS. 3A-3B are block diagrams illustrating example user interfaces provided by example embodiments. FIG. 3C illustrates example program information used by example embodiments.

FIG. 3A shows a user interface screen 310 displayed upon a presentation device 120. The screen 310 includes a message 302 and user-selectable controls 306a-306c. The message 302 is an example message displayed by a recording manager 100 in response to a received indication that a user desires to view a disrupted recorded program. In particular, message 302 indicates that a disruption was detected during a recording of a program titled "TV Show XYZ," transmitted starting at 7 PM on Jun. 29, 2009. The message 302 further notifies the user that the program has been re-recorded, and prompts the user to select the original or later recording for viewing. The user-selectable controls 306a-306c are buttons that can be activated/selected by the user to respectively view the first (disrupted) recording of the program, the second (retransmission) recording of the program, or access settings of the recording manager 100.

Other user interface features/controls are contemplated. For example, details regarding the nature of the disruption may be provided (e.g., signal outage lasting five seconds). Also, in some cases, both the first and second recordings may include disruptions. In such circumstances, the recording manager 100 may evaluate the quality of each of the two recordings, and provide via message 302 an indication of the comparative quality of the two recordings and/or a suggestion to view one of the two recordings based on that recording having the higher quality level. Other controls may be included to provide access to other functions, such as deleting a recording, merging/combining recordings, and the like.

In addition, other techniques for notifying the user of the disruption are contemplated. In one embodiment, the recording manager 100 may send a message, such as an email, text message, or the like, to interact with the user in various ways, such as notifying the user of the disruption, requesting permission to record a retransmission of a prior program, and the like.

FIG. 3B shows user interface screen 320 displayed upon a presentation device 120. The screen 320 includes various user-selectable controls 312 that can be activated by a user to control or specify the operation/behavior of the recording manager 100. In particular, the controls 312 include controls 312a-312d for specifying triggers for recording retransmissions of prior programs. In particular, checkbox 312a directs the recording manager 100 to always record retransmissions of prior programs. Checkbox 312b directs the recording manager 100 to only record retransmissions of prior programs that are disrupted for more than a specified time interval (set to 30 seconds in this example). Checkbox 312c directs the recording manager 100 to detect commercials for purposes of determining whether to record a retransmission of a prior program having disrupted commercials. Checkbox 312d directs the recording manager 100 to record retransmissions of prior programs in which disruptions occur during commercials, as compared to a default behavior of ignoring disruptions that occur during commercial breaks and only recording retransmissions of prior programs that are disrupted during regular programming. The controls 312 also include controls 312e-312f for specifying actions to take with disrupted recordings, such as checkbox 312e directing the recording manager 100 to always delete disrupted recordings and checkbox 312f directing the recording manager 100 to automatically choose the best recording, when multiple recordings of one program all have some form of disruption. In addition, the controls 312 include checkbox 312g for establishing priority of recording retransmissions over otherwise scheduled recordings. When checkbox 312g is checked and when a retransmission of a prior program occurs at the same time as an otherwise scheduled recording, the recording manager 100 will elect to record the retransmission of the prior program in preference to performing the otherwise scheduled recording. In other embodiments, other techniques may be used to resolve scheduling conflicts, such as requesting the user to indicate their preference (e.g., via a dialog presented on the presentation device 120) on a case-by-case basis.

FIG. 3C illustrates example program information used by an example embodiment. The example program information is arranged in a table 330 comprising rows 334a-334j. Each row specifies a program record that provides information about a particular program, the information organized into fields 332a-332f. Fields 332a-332e respectively includes a program identifier, a channel number, a program title, a start time, and a duration. Field 332f indicates that in other embodiments, additional information may be included.

The recording manager 100 utilizes program information such as that shown in table 330 to determine a retransmission of a prior program. For example, suppose a disruption occurs during recording of "Sitcom 1," transmitted between 12:30 and 1:00 PM on Jun. 30, 2009, as represented in row 334a. In response to the disruption, the recording manager 100 searches the program information of table 320 for a retransmission of the prior program, indicated by a program having the same identifier (3439) as the prior program. Finding such a program in row 334e, the recording manager 100 schedules a recording to take place during the transmission time interval specified by fields 332d and 332e of row 334e (between 5:30 and 6:00 PM on Jul. 2, 2009).

In some cases, the recording manager 100 cannot find a retransmission of a prior program in the program information. In one embodiment, the recording manager 100 will elect to record a later-transmitted program that is related to the prior program. For example, daily news programs such as the evening news are typically not re-transmitted. If a recording of an evening news program (occurring at 6:00 PM) was disrupted, the recording manager 100 may record another news program, such as the nightly news (occurring at 11:00 PM). In another embodiment, the recording manager 100 will store an indication that a retransmission of a particular program was not found, such that the recording manager 100 can search again at a later time, such as when the program information is updated with information about additional future programs.

In other embodiments, the information shown in table 330 may be represented in other ways. For example, rather than specifying a start time and duration, a program record (row) could specify start and end times. Other information, such as reviews, ratings, summaries, and the like, may also be represented.

D. Example Computing System Implementation

Figure 4:
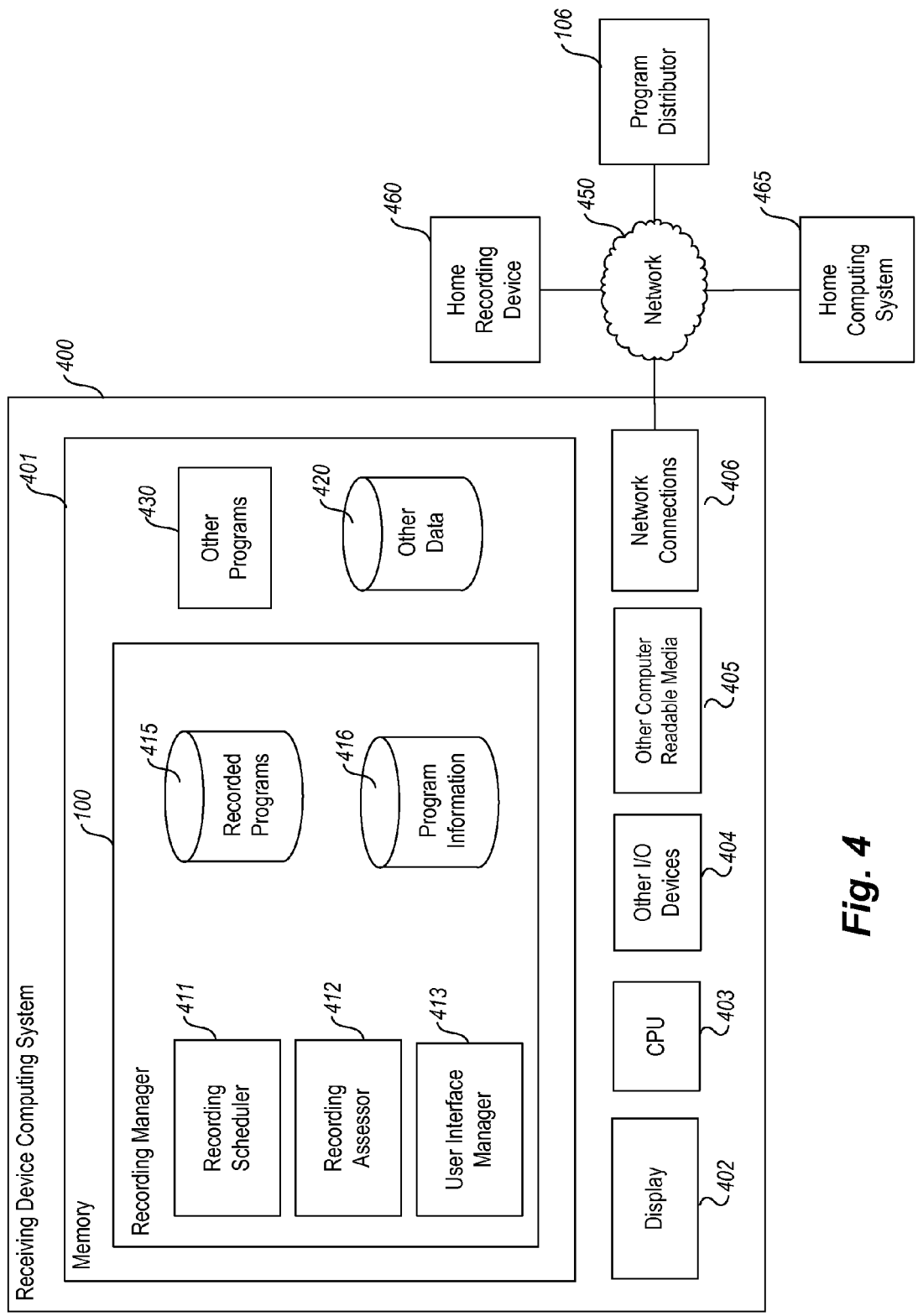
FIG. 4 is a block diagram of a computing system for practicing example embodiments of a recording manager.

FIG. 4 is a block diagram of a computing system for practicing example embodiments of a recording manager. FIG. 4 shows a receiving device computing system 400 that may be utilized to implement a recording manager 100. In one embodiment, the receiving device computing system 400 is part of a set-top box configured to receive and display programming on a presentation device. In other embodiments, the receiving device computing system 400 is part of a presentation device, such as a television.

Note that one or more general purpose or special purpose computing systems/devices may be used to implement the recording manager 100. In addition, the computing system 400 may comprise one or more distinct computing systems/devices and may span distributed locations. Furthermore, each block shown may represent one or more such blocks as appropriate to a specific embodiment or may be combined with other blocks. Also, the recording manager 100 may be implemented in software, hardware, firmware, or in some combination to achieve the capabilities described herein.

In the embodiment shown, receiving device computing system 400 comprises a computer memory ("memory") 401, a display 402, one or more Central Processing Units ("CPU") 403, Input/Output devices 404 (e.g., keyboard, mouse, CRT or LCD display, and the like), other computer-readable media 405, and network connections 406. The recording manager 100 is shown residing in memory 401. In other embodiments, some portion of the contents, some of, or all of the components of the recording manager 100 may be stored on and/or transmitted over the other computer-readable media 405. The components of the recording manager 100 preferably execute on one or more CPUs 403 and facilitate the recording of retransmissions of prior programming, as described herein. Other code or programs 430 (e.g., an audio/video processing module, a program guide manager module, a Web server, and the like) and potentially other data repositories, such as data repository 420, also reside in the memory 401, and preferably execute on one or more CPUs 403. Of note, one or more of the components in FIG. 4 may not be present in any specific implementation. For example, some embodiments may not provide other computer readable media 405 or a display 402.

In a typical embodiment, the recording manager 100 includes a recording scheduler 411, a recording assessor 412, a user interface manager 413, a data repository 415 that includes recorded programs, and a data repository 416 that includes program information. Other and/or different modules may be implemented. The recording manager 100 interacts via a network 450 with home recording device 460 (e.g., a digital video recorder), program distributor 106, and home computing system 465 (e.g., a desktop computer, a laptop computer).

The recording scheduler 411 provides the recording and scheduling functions of the recording manager 100. For example, the recording scheduler 411 tracks, initiates, and performs scheduled recordings, by directing program content received by the computing system 400 during particular time intervals to be stored in data repository 415. The recording scheduler 411 is also configured to search the program information in data repository 416 to determine and schedule recordings retransmissions of particular (e.g., disrupted) programs.

The recording assessor 412 provides the disruption detection and/or quality assessment functions of the recording manager 100. The recording assessor 412 inspects the characteristics of a program signal received by the computing system 400, to determine whether the program signal is disrupted/degraded. In addition, the recording assessor 412 processes programs stored in the data repository 415 during or after their recording, to determine whether any disruptions have occurred or to determine a quality level for a recorded program. A quality level may be a numeric indicator that rates the video and/or audio quality of a particular recording. When the recording assessor 412 detects a disruption in a program, it directs the recording scheduler 411 to determine and schedule a recording of a retransmission of the program.

The user interface manager 413 provides a view and a controller that facilitate user interaction with the recording manager 100 and its various components. For example, the user interface manager 413 provides interactive graphical user interface screens such as those described with respect to FIGS. 3A-3B. As discussed, such user interface screens notify the user of disruptions, provide the user with the option of viewing an alternate recording of a program, and provide the user with controls for specifying the operation of the recording manager 100. The user interface manager 413 also receives input from a user (e.g., in the form of user interface events) and translates those inputs into the appropriate command for initiation by the recording manager 100.

In some embodiments, the recording manager includes an application program interface ("API") that provides programmatic access to one or more functions of the recording manager 100. For example, such an API may provide a programmatic interface to one or more functions of the recording manager 100 that may be invoked by one of the other programs 430 or some other module. In this manner, the API may facilitate the development of third-party software, such as user interfaces, plug-ins, adapters (e.g., for integrating functions of the recording manager 100 into desktop applications), and the like.

In addition, the API may be in at least some embodiments invoked or otherwise accessed via remote entities, such as the home recording device 460, the program distributor 106, or the computing system 465, to access various functions of the recording manager 100. For example, a user operating the computing system 465 may schedule a recording to be made by the recording manager 100 via the API.

The data repository 415 stores one or more recorded programs received by the computing system 400, such as the first and second recordings 206 and 208 described with respect to FIG. 2. When a user indicates a desire to view a recorded program, the recording manager 100 initiates playback of the recorded program from the data repository 415.

The data repository 416 stores program information such as that described with respect to FIG. 3C. As discussed, such information may include program identifiers, titles, times, ratings, commentary, and other metadata. The recording manager 100, and in particular the recording scheduler 411, utilizes the program information to schedule programs and to determine if and when programs will be re-transmitted.

In some embodiments, the recording manager 100 interacts with the home recording device 460 and/or the home computing system 465 for various purposes. For example, the recording manager 100 may schedule a recording to be made by the home recording device 460, such as when the recording manager 100 has multiple recording events scheduled for the same or overlapping time period. In other cases, such as when data store 415 has reached its maximum capacity or the computing system 400 is itself not configured to record programs, the recording manager 100 may utilize the home recording device 460 to store recorded programs.

In an example embodiment, components/modules of the recording manager 100 are implemented using standard programming techniques. For example, the recording manager 100 may be implemented as a "native" executable running on the CPU 403, along with one or more static or dynamic libraries. In other embodiments, the recording manager 100 may be implemented as instructions processed by a virtual machine that executes as one of the other programs 430. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), declarative (e.g., SQL, Prolog, and the like).

In a software or firmware implementation, instructions stored in a memory configure, when executed, one or more processors of the computing system 400 to perform the functions of the recording manager 100. In one embodiment, instructions cause the CPU 403 or some other processor, such as an I/O controller/processor, to record programs, such as by consuming program data and writing it to a disk or other storage device, by initiating a suitable DMA operation, or the like. Similarly, the CPU 403 or other processor may be configured to perform other operations such as detecting disruptions, scheduling recordings, and the like.

The embodiments described above may also use well-known or proprietary synchronous or asynchronous client-server computing techniques. However, the various components may be implemented using more monolithic programming techniques as well, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported by an recording manager implementation. Also, other functions could be implemented and/or performed by each component/module, and in different orders, and by different components/modules, yet still achieve the functions of the recording manager.

In addition, programming interfaces to the data stored as part of the recording manager 100, such as in the data repositories 415-416, can be available by standard mechanisms such as through C, C++, C#, and Java APIs; libraries for accessing files, databases, or other data repositories; through scripting languages such as XML; or through Web servers, FTP servers, or other types of servers providing access to stored data. The data repositories 415-416 may be implemented as one or more database systems, file systems, or any other technique for storing such information, or any combination of the above, including implementations using distributed computing techniques.

Different configurations and locations of programs and data are contemplated for use with techniques of described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions of an recording manager.

Furthermore, in some embodiments, some or all of the components of the recording manager 100 may be implemented or provided in other manners, such as at least partially in firmware and/or hardware, including, but not limited to one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

E. Processes

Figure 5:
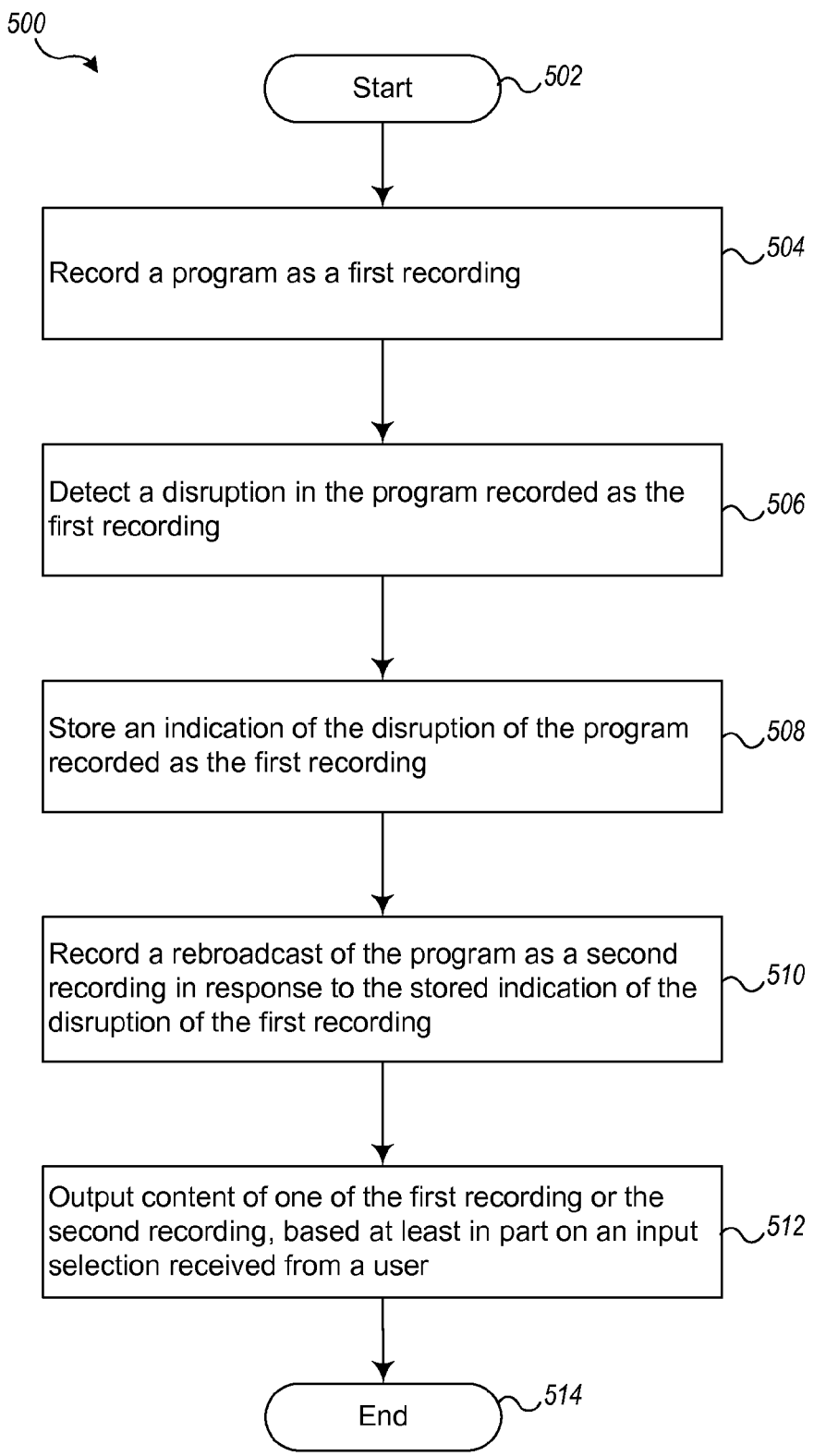
FIG. 5 is a flow diagram of an example recording manager process provided by one example embodiment.

FIG. 5 is a flow diagram of an example recording manager process provided by one example embodiment. In particular, FIG. 5 illustrates process 500 that may be implemented by, for example, one or more modules/components of the recording manager 100 executing on the receiving device 118, as described with respect to FIGS. 2 and 4.

The illustrated process 500 starts at 502. At 504, the process records a program as a first recording. The first recording may be recording 206 described with respect to FIG. 2, and stored in data repository 415 described with respect to FIG. 4.

At 506, the process detects a disruption in the program recorded as the first recording. Detecting the disruption may include detecting degraded/disrupted audio and/or video of the first recording. Detecting the disruption may also include detecting a degraded or weak program signal received by the receiving device 118. Program disruptions are described further with respect to FIGS. 1 and 2.

At 508, the process stores an indication of the disruption of the program recorded as the first recording. At 510, the process records a rebroadcast of the program as a second recording in response to the stored indication of the disruption of the first recording. The rebroadcast typically occurs at a second time that is later than the time of the first recording. The second recording may be recording 208 described with respect to FIG. 2.

At 512, the process outputs content of one of the first recording or the second recording, based at least in part on an input selection received from a user. For example, the process may notify the user of the disruption, and prompt the user to select either the first or second recording, as described with respect to FIG. 3A.

At 514, the process ends. In other embodiments, the process may instead continue to one of steps 504-512 in order to manage further recordings and/or handle additional user inputs.

Some embodiments perform one or more operations/aspects in addition to the ones described with respect to process 500. For example, in one embodiment, process 500 automatically merges the first and second recording in a manner that selects the highest quality portions from each of the first and second recording to construct a recording having a minimum of disruptions.

Figure 6:
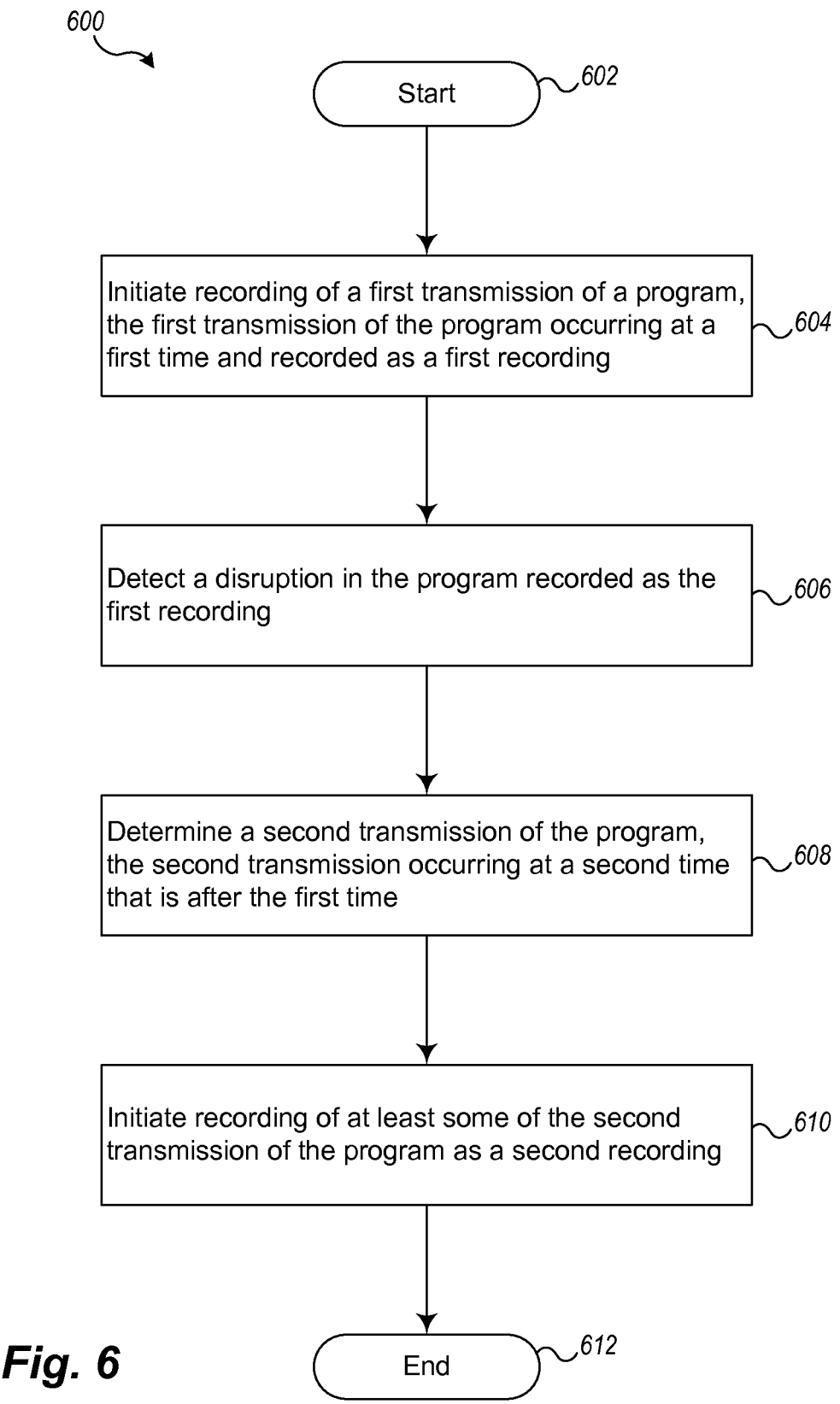
FIG. 6 is a flow diagram of an example recording manager process provided by another example embodiment.

FIG. 6 is a flow diagram of an example recording manager process provided by another example embodiment. In particular, FIG. 6 illustrates process 600 that may be implemented by, for example, one or more modules/components of the recording manager 100 executing on the receiving device 118, as described with respect to FIGS. 2 and 4.

The illustrated process 600 starts at 602. At 604, the process initiates recording of a first transmission of a program, the first transmission of the program occurring at a first time and recorded as a first recording. The first recording may be, for example, the recording 206 described with respect to FIG. 2.

At 606, the process detects a disruption in the program recorded as the first recording. Detecting the disruption may occur concurrently with the first transmission and/or after at least some of the recording has been completed. Additional details regarded detecting disruptions are provided with respect to FIGS. 1 and 2.

At 608, the process determines a second transmission of the program, the second transmission occurring at a second time that is after the first time. Determining the second transmission may include searching program information as described with respect to FIG. 3C.

At 610, the process initiates recording of at least some of the second transmission of the program as a second recording. In some cases, the entire second transmission is recorded. However, in other cases, only some portion or portions of the second transmission is recorded. For example, these portions may correspond to the disrupted portions of the first recording, such that the recording manager can conserve storage (e.g., disk space).

At 612, the process ends. In other embodiments, the process may instead continue to one of steps 604-610 in order to manage further recordings and/or handle additional user inputs.

Some embodiments perform one or more operations/aspects in addition to the ones described with respect to process 600. For example, in one embodiment, process 600 automatically "patches" the first recording with the recorded portions of the second transmission. In another embodiment, process 600 automatically deletes the first recording or some portion thereof.

While various embodiments have been described hereinabove, it is to be appreciated that various changes in form and detail may be made without departing from the spirit and scope of the invention(s) presently or hereafter claimed.

The invention claimed is:

1. A method in a set-top box for recording a retransmission of a prior program, the method comprising:
    recording a program as a first recording;
    detecting a disruption in the program recorded as the first recording;
    storing an indication of the disruption of the program recorded as the first recording;
    determining to record a second transmission of the program as a second recording based at least on the detected disruption in the first recording, the second recording being in addition to and separate from the first recording;
    recording the second transmission of the program; and
    outputting content of one of the first recording or the second recording, based at least in part on an input selection between the first recording and the second recording received from a user.

2. The method of claim 1 wherein the disruption in the program recorded as the first recording is detected while the program is being broadcast and the first recording is being stored.

3. The method of claim 1, further comprising:
    notifying the user of the detected disruption in the program recorded as the first recording; and
    notifying the user of an option to view the program recorded as the second recording.

4. The method of claim 1, further comprising presenting a first graphical user interface including a first plurality of user-selectable controls, the first plurality of user-selectable controls indicating triggers for repeat recording;
    receiving a first input from a user, the input being a selection of at least one of the first plurality of user-selectable controls, wherein
    determining to record the second transmission of the program as a second recording is based at least on the first input.

5. The method of claim 1 wherein detecting the disruption in the program recorded as the first recording includes detecting an audio disruption in the first recording.

6. The method of claim 1 wherein detecting the disruption in the program recorded as the first recording includes detecting a video disruption in the first recording.

7. The method of claim 1 wherein the program recorded as the first recording is received via a program signal, and wherein detecting the disruption in the program recorded as the first recording includes determining whether a strength of the program signal is below a predetermined threshold level.

8. The method of claim 1, further comprising
    presenting a second graphical user interface including a second plurality of user-selectable controls, the second plurality of user-selectable controls indicating available contents for viewing;
    receiving a second input from the user, and
    outputting content of one of the first recording and the second recording.

9. A receiving device configured to record a retransmission of a program, the receiving device comprising:
    a processor configured to:
        record, at a first time, a program as a first recording;
        detect a disruption in the program recorded as the first recording;
        in response to detecting the disruption,
            determine a rebroadcast of the program, the rebroadcast occurring at a second time that is later than the first time;
            determine to record, at the second time, the program as a second recording based at least on the detected disruption, the second recording being in addition to and separate from the first recording; and
        output program content of one of the first recording and the second recording, based at least on an input selection between the first recording and the second recording received from a user.

10. The receiving device of claim 9 wherein the processor is further configured to:
    present a first graphical user interface including a first plurality of user-selectable controls, the first plurality of user-selectable controls indicating triggers for repeat recording, and
    receive a first input from the user, the first input being a selection of at least one of the first plurality of user-selectable controls, wherein the processor determines to record based at least on the first input.

11. The receiving device of claim 9 wherein the processor is further configured to:
    notify the user of the disruption in the program recorded as the first recording.

12. The receiving device of claim 9 wherein the first recording includes an audio and a video portion, and wherein at least one of the audio portion and the video portion is degraded.

13. A non-transitory computer-readable storage medium having contents that enable a receiving device to record a retransmission of a program, by performing a method comprising:
   initiating recording of a first transmission of a program, the first transmission of the program occurring at a first time and recorded as a first recording;
   detecting a disruption in the program recorded as the first recording; and
   in response to the detected disruption in the program recorded as the first recording,
      determining a second transmission of the program, the second transmission occurring at a second time that is after the first time; and
      initiating recording of at least some of the second transmission of the program as a second recording based at least on the detected disruption, the second recording being in addition to and separate from the first recording; and
      outputting content of one of the first recording or the second recording, based at least in part on an input selection between the first recording and the second recording received from a user.

14. The non-transitory computer-readable storage medium of claim 13 wherein the outputting content of one of the first recording or the second recording, based at least in part on an input selection between the first recording and the second recording received from the user comprises:
   notifying the user of the detected disruption in the program recorded as the first recording;
   notifying the user of the second recording;
   receiving from the user an indication to view either the first recording or the second recording; and
   initiating presentation of either the first recording or the second recording, based on the received indication.

15. The non-transitory computer-readable storage medium of claim 13 wherein the method further comprises
   presenting a first graphical user interface including a first plurality of user-selectable controls, the first plurality of user-selectable controls indicating triggers for repeat recording, and
   receiving a first input from the user, the first input selecting at least one of the first plurality of user-selectable controls, wherein initiating recording of at least some of the second transmission of the program as a second recording is based at least on the first input.

16. The non-transitory computer-readable storage medium of claim 15 wherein the user preference is determined based on a selection of at least one of the first plurality of user-selectable controls.

17. The non-transitory computer-readable storage medium of claim 13 wherein detecting the disruption in the program recorded as the first recording includes processing the first recording for audio/video disruptions after the first transmission of the program is completed.

* * * * *